# United States Patent Office 3,271,463
Patented Sept. 6, 1966

3,271,463
PREPARATION OF INDANOLS
William L. Howard, Jackson, Tex., assignor to The Dow Chemical Company, Midland, Mich., a corporation of Delaware
No Drawing. Filed Mar. 23, 1962, Ser. No. 182,100
3 Claims. (Cl. 260—619)

This invention relates to an improved process for making certain substituted indanols. More particularly, it relates to a process whereby practical yields of these indanols may be obtained from the acid-catalyzed condensation of bisphenols.

It is known that when p,p'-isopropylidenediphenol or a similar bisphenol is heated at about 100° C. with concentrated hydrochloric acid, the corresponding phenol is liberated and various other decomposition and condensation products are formed. From the higher boiling residues thereby obtained, small quantities of crystalline solids have been isolated, amounting to about 5% by weight of the original bisphenol. These solids have been found to consist largely of indanols and spiroindanols. From p,p'-isopropylidenediphenol there is obtained 3,3,3',3'-tetramethylbis-1,1'-spiro-6-indanol which has the structure

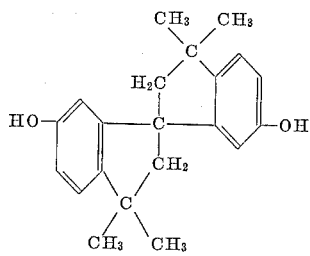

together with a small amount of 1-(p-hydroxyphenyl)-1,3,3-trimethyl-6-indanol, this compound having the structure

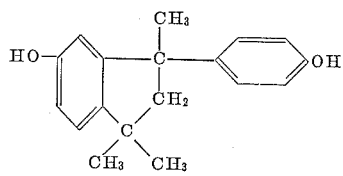

This reaction is described by J. von Braun, Annalen, 472, 65 (1929), and the structure of the products is discussed by R. Curtis, Chem. and Ind., 29, 928 (1960).

The above reaction as disclosed by this and related prior art, however, is of only academic interest as a method for making these compounds because of the very low yields obtained. Also, the characteristics of the acid reactant and the resinous decomposition products formed are not easily compatible with larger scale use of the process.

It has now been discovered that indanols of the general structure shown are produced in practical yield when p,p'-isopropylidenediphenol or similar bisphenol is heated at about 90° C. to about 150° C. in admixture with aqueous sulfuric acid of about 7 to about 15 molar concentration. Although one would reasonably expect hydrochloric and sulfuric acids of similar concentration to be practical equivalents in the reaction, such is not the case and yields obtained using sulfuric acid exceed those with hydrochloric acid by a considerable factor. As in the known process, the crystalline product formed contains the spiro compound in a proportion of about ten times that of the minor component, but the actual yields of the two compounds are increased about tenfold. The pure compounds can be separated from the organic portion of the reaction product by conventional means, preferably by fractional crystallization from an organic solvent. Suitable solvents include aromatic hydrocarbons such as benzene, toluene, and xylene and halogenated hydrocabons such as ethylene dichloride and chlorobenzene.

Bisphenols suitable for use in the reaction are those having unsubstituted ring positions adjacent to the alkylidene group linking together the phenolic rings, said alkylidene group having been derived from aliphatic or cycloaliphatic ketones having at least one alpha hydrogen atom and having from three to about ten carbon atoms in the molecule. Ketones thereby defined include acetone, methyl ethyl ketone, methyl isobutyl ketone, cyclopentanone, cyclohexanone, methylcyclohexanone, and similar compounds. Substituents on the phenolic rings, if any, may include halogen or primary and secondary lower alkyl groups.

The quantity of sulfuric acid to be used in the reaction is that required to give a substantial conversion, that is, larger than ordinary catalytic amounts. For practical reasons of a conveniently handled reaction mixture and better yields, at least about an equal weight of aqueous sulfuric acid is used, based on the weight of diphenol. Concentrations of sulfuric acid less than the minimum limit specified give much diminished yields with increased formation of higher condensation products because of longer reaction times required. Operation of the process with acid in concentrations higher than the maximum shown about is not practical because of sulfonation and tar formation. The process is run most advantageously with sulfuric acid of 10–12 molar concentration.

An appreciable length of reaction time is required to obtain substantial conversions. Under preferred reaction conditions, reaction times of 2–10 hours are typical.

A solvent which is inert toward the reactants under the conditions specified may be employed but is not necessary.

The process is ordinarily run under atmospheric pressure at about the reflux temperature of the aqueous sulfuric acid. This constitutes an additional advantage over the prior hydrochloric acid method which requires operation under pressure at similar acid concentrations and temperatures. This process may also be operated under other than atmospheric pressure but there is ordinarily no advantage in doing so.

Example 1 illustrates the process as carried out with bisphenol A under preferred reaction conditions.

*Example 1*

A mixture of 456 g. of powdered p,p'-isopropylidenediphenol and 800 g. of 10 molar sulfuric acid was heated at about 140° C. for six hours with stirring. The reaction mixture was then cooled and the solid cake of crystals which formed was separated by filtration, dissolved in acetone, and steam distilled to remove volatile organic material. The solid residue from the steam distillation was dissolved in hot toluene and a small amount of remaining water was distilled off. On cooling the dried solution, crystals formed and these were filtered and washed successively with cold benzene and petroleum ether. The light brown crystals thereby obtained had a melting point of 214–217° C. and the material was identified as 3,3,3',3'-tetramethylbis-1,1'-spiro-6-indanol. Further recrystallization of this product yielded white crystals melting at about 218° C. Evaporation of the toluene mother liquor yielded another crop of crystals which consisted of 65% by weight of the spiro compound plus 35% of 1-(p-hydroxyphenyl)-1,3,3-trimethyl-6-indanol. These compounds were separable on further fractional crystallization. Total yields were 52% by weight of the spiro compound and about 6% of the 1-(p-hydroxyphenyl)-1,3,3-trimethyl-6-indanol, based on the weight of the starting p,p'-isopropylidenediphenol.

Example 2 contrasts the above results with those obtained by the method described in the literature.

Example 2

A mixture of 10 g. powdered p,p'-isopropylidenediphenol and 30 ml. of conc. HCl was heated in a sealed glass container for 24 hours at about 100° C. The reaction mixture was then worked up by the method of Von Braun, essentially as shown above, and a 5% yield of the spiro compound was obtained together with 0.5% of the minor product, yields being figured on the same basis as in Example 1.

By reacting other usitable bisphenols with sulfuric acid by the general method as illustrated in Example 1, similar yields of the corresponding indanols are obtained.

I claim:

1. A process for making indanols which comprises reacting by contacting p,p'-isopropylidenediphenol with aqueous sulfuric acid of from about 7 to about 15 molar concentration at about 90° C. to about 150° C. for a length of time sufficient for substantial reaction to take place, and separating from the reaction mixture thereby produced 3,3,3',3'-tetramethylbis-1,1'-spiro-6-indanol.

2. The process of claim 1 wherein the concentration of the aqueous sulfuric acid is 10–12 molar.

3. A process for making 3,3,3',3'-tetramethylbis-1,1'-spiro-6-indanol which comprises reacting by contacting p,p'-isopropylidenediphenol with at least about an equal weight of aqueous sulfuric acid of from about 7 to about 15 molar concentration at about 90° C. to about 150° C. for from about 2 to about 10 hours, and separating from the reaction mixture thereby produced the compound 3,3,3',3'-tetramethylbis-1,1'-spiro-6-indanol.

References Cited by the Examiner

UNITED STATES PATENTS 2,979,534  4/1961  Petropoulos _____ 260—619

LEON ZITVER, *Primary Examiner.*

LORRAINE A. WEINBERGER, *Examiner.*

M. B. ROBERTO, D. HELFER, *Assistant Examiners.*